Patented Jan. 16, 1934

1,944,066

UNITED STATES PATENT OFFICE 1,944,066

STORAGE BATTERY

Rufus N. Chamberlain, Chicago, Ill., assignor, by mesne assignments, to Gould Storage Battery Corporation, Depew, N. Y., a corporation of Delaware No Drawing. Application March 7, 1930
Serial No. 434,171

2 Claims. (Cl. 136—26)

The invention relates to storage batteries and has special reference to a method of and means for prolonging the life thereof.

It is well known that the active material in the plates of batteries of the pasted plate type may for some reason or other crumble, crack or break and fall away, or at least become loose, resulting in serious impairment of the effectiveness of the battery. The plan has been adopted of employing glass wool mats under slight pressure against the surfaces of pasted plates and this has increased the life of the active material to a considerable extent. However, unless disintegration be prevented the full benefits of the use of glass wool mats cannot be obtained.

It is with the above facts in view that I have developed the present invention which has for its principal object the provision of a method and means whereby disintegration of the plates will be avoided without reducing the electrical capacity.

Another object of the invention is to provide a method and means for this purpose which will not involve any changes in the manufacture of the metallic parts of the battery or the replacement of an existing element.

A more specific object of the invention is to provide an active material for the plates embodying an ingredient which will act to protect the plates against the usual comparatively rapid deterioration and disintegration.

To the attainment of the foregoing and other objects and advantages, the invention consists in the details to be hereinafter more fully described and claimed.

In carrying out the invention, the plates have paste applied thereto in the usual manner, the important feature being that the material commonly used have added thereto a compound of cobalt such as a salt, which may conveniently be cobaltous sulphate. In actual practice I have discovered that cobalt has the property of protecting the plates against disintegration. The exact theory as to why the cobalt has this faculty has, as yet, not been fully understood but the theory is immaterial as the actual beneficial result is known to me and can be ascertained by tests. The cobalt compound is preferably mixed with the paste prior to the application thereof to the plate, and the exact proportion of cobalt compound may of course be varied, though I have discovered that only a small percentage thereof, approximately one-tenth to five-tenths of one per cent, is sufficient to accomplish the desired results.

The action has been described as protection of the plates against disintegration and it will be readily understood that the ultimate effect is that the life of the entire battery is greatly prolonged as the active material will not loosen and fall away from or drop off the foundation. From a long series of experiments and tests conducted through many cycles of charge and discharge, I have discovered that when the active material of the plates has the cobalt compound incorporated in them there is less self-discharge of the battery on an open circuit and a lower back pressure on charge.

From the foregoing description it will be apparent that I have thus provided a very simple and inexpensive plan for prolonging the life of storage battery plates. It is thought that the exact details and steps will suggest themselves to and be well understood by one skilled in the art without further explanation.

Having thus described the invention, I claim:

1. A pasted storage battery plate including lead-acid active material having as one of its ingredients from .1 to .5 of 1% by weight of sulphate of cobalt.

2. Active material for a storage battery plate of the pasted type comprising from .1 to .5 of 1% by weight of cobalt sulphate, incorporated in a lead-acid mass.

RUFUS N. CHAMBERLAIN.